United States Patent
Chen et al.

(10) Patent No.: US 9,810,309 B2
(45) Date of Patent: Nov. 7, 2017

(54) REVERSE GEAR INTERMEDIATE SHAFT SUPPORTING STRUCTURE OF TRANSMISSION

(71) Applicant: Shaanxi Fast Gear Co., Ltd., Shaanxi (CN)

(72) Inventors: Xiaoguo Chen, Shaanxi (CN); Rui Jia, Shaanxi (CN); Chunxiu You, Shaanxi (CN); Jing Yu, Shaanxi (CN); Chongyi Yin, Shaanxi (CN)

(73) Assignee: Shaanxi Fast Gear Co., Ltd., Shaanxi (CN)

( * ) Notice: Subject to any disclaimer, the term of this patent is extended or adjusted under 35 U.S.C. 154(b) by 0 days.

(21) Appl. No.: 14/394,596

(22) PCT Filed: Jun. 7, 2013

(86) PCT No.: PCT/CN2013/076905
§ 371 (c)(1),
(2) Date: Oct. 15, 2014

(87) PCT Pub. No.: WO2014/048132
PCT Pub. Date: Apr. 3, 2014

(65) Prior Publication Data
US 2015/0226312 A1    Aug. 13, 2015

(30) Foreign Application Priority Data

Sep. 27, 2012   (CN) .................... 2012 2 0499043 U

(51) Int. Cl.
*F16H 57/021* (2012.01)
*F16H 3/08* (2006.01)
*F16H 57/02* (2012.01)

(52) U.S. Cl.
CPC ... *F16H 57/021* (2013.01); *F16H 2003/0822* (2013.01); *F16H 2057/0216* (2013.01);
(Continued)

(58) Field of Classification Search
CPC ...................... F16H 57/021; F16H 2057/0216
(Continued)

(56) References Cited

U.S. PATENT DOCUMENTS 2,660,900 A * 12/1953 Swenson .................. F16H 3/16
                                                                    74/333
3,645,147 A   2/1972 Fodrea
(Continued)

FOREIGN PATENT DOCUMENTS

CN      201215175 Y      4/2009
CN      102466025 A      5/2012
(Continued)

OTHER PUBLICATIONS

Extended European Search Report issued by European Patent Office for corresponding European application 13840711.9 dated Apr. 22, 2016.

*Primary Examiner* — Vicky Johnson
(74) *Attorney, Agent, or Firm* — Haug Partners LLP

(57) ABSTRACT

A supporting structure for a reverse countershaft of a transmission includes a transmission case, a partition wall and a boss, wherein the transmission case, the partition wall and the boss are formed integrally; a reverse idler gear installation space is provided between a side, close to a transmission main case, of the partition wall and the boss; and the partition wall is provided with a second reverse countershaft supporting hole and an auxiliary case countershaft supporting hole which are not concentric. In supporting structure for the reverse countershaft of the transmission, multiple ribs are used to support the boss of the reverse countershaft, the boss of the reverse intermediate shaft is cast until reaching the rear auxiliary case partition wall, and in combination with machining work, the reverse idle wheel space is milled by a disc milling cutter.

13 Claims, 5 Drawing Sheets

(52) U.S. Cl.
CPC .............. *F16H 2057/02017* (2013.01); *F16H 2057/02043* (2013.01); *F16H 2057/02091* (2013.01); *Y10T 74/2186* (2015.01)

(58) Field of Classification Search
USPC ...................................................... 74/606 R
See application file for complete search history.

(56) References Cited

U.S. PATENT DOCUMENTS

| | | | |
|---|---|---|---|
| 4,242,923 A * | 1/1981 | Nishikawa | B60K 17/08 184/6.12 |
| 5,647,246 A | 7/1997 | Craft et al. | |
| 2007/0155572 A1* | 7/2007 | Sugano | B60K 17/344 475/205 |
| 2009/0138162 A1* | 5/2009 | Futamura | F16H 61/0021 701/55 |

FOREIGN PATENT DOCUMENTS

| | | | | |
|---|---|---|---|---|
| CN | 102878272 A | 1/2013 | | |
| CN | 202946651 U | 5/2013 | | |
| DE | 10052651 A1 * | 6/2001 | ......... | B29C 47/0801 |
| GB | 1252220 | 11/1971 | | |
| JP | 2001-116119 A | 4/2001 | | |
| JP | 2008-261400 A | 10/2008 | | |

* cited by examiner

REVERSE GEAR INTERMEDIATE SHAFT SUPPORTING STRUCTURE OF TRANSMISSION

This application is a 371 of PCT/CN2013/076905 filed on Jun. 7, 2013 titled "Reverse Gear Intermediate Shaft Supporting Structure of Transmission" and published on Apr. 3, 2014 under publication number WO 2014/048132 A1 and which claims the benefit of priority to Chinese Patent Application No. 201220499043.5, titled "SUPPORTING STRUCTURE FOR REVERSE COUNTERSHAFT OF TRANSMISSION", filed with the Chinese State Intellectual Property Office on Sep. 27, 2012, the entire disclosures of both applications are incorporated herein by reference.

TECHNICAL FIELD

The present application relates to the technical field of automobile transmissions, and particularly to a supporting structure for a reverse countershaft of a transmission.

BACKGROUND

Heavy-duty automobiles have various transmissions, and the transmission for a multi-gear heavy-duty automobile generally has a combined structure of a main case and an auxiliary case, and currently, the structure of main and auxiliary cases having two countershafts is a typical structure for the transmissions of the heavy-duty automobiles. In such structure, on a cross section of a partition wall of the rear auxiliary case, a rear supporting hole for a reverse countershaft of the main case is in an area of a front bearing of the countershaft of the auxiliary case, thus the rear portion of the reverse countershaft is suspended. The reverse countershaft is generally in a cantilever form being locked in the case by a nut and positioned by a boss for the reverse countershaft, and this positioning manner requires that the reverse countershaft and assembly and the transmission case are assembled to form an assembly in advance. For a transmission having a cylinder main case structure and helical gears, the countershaft is difficult to be fitted into the main case when the reverse countershaft gear is fixed.

The positioning of the front bearing of the auxiliary case countershaft is also very important, and conventionally, a reverse cup is installed at a rear of the reverse countershaft gear to axially position the auxiliary case countershaft. In such positioning manner, the reverse countershaft is in the cantilever form, it is difficult or even impossible to assemble the reverse countershaft in the transmission having the cylinder main case structure and helical gears.

With vigorous promotion of energy saving and emission reduction domestically, lightweight design of automobile is imperative, and lightweight design of transmission is a significant part of the lightweight design of automobile, and the transmission case using aluminum alloy to realize the lightweight design is also an irresistible trend. Since a space, where the reverse countershaft gear is located, forms an inverted structure inside the case, and for ensuring the feasibility of the casting, a window is generally provided at a side face of the case corresponding to the reverse countershaft gear, however, the case with windows at both side faces may significantly reduce the strength and rigidity of the transmission housing, and may cause a complex manufacturing process, increase the oil leakage fault points, and also adversely affect the appearance of the transmission.

SUMMARY

An object of the present application is to provide a supporting structure for a reverse countershaft of a transmission, to solve the above technical problems.

To achieve the above objects, the present application provides the following technical solutions.

A supporting structure for a reverse countershaft of a transmission includes a transmission case, a partition wall and a boss, wherein the transmission case, the partition wall and the boss are formed integrally; a reverse idler gear installation space is provided between a side, close to a transmission main case, of the partition wall and the boss; and the partition wall is provided with a second reverse countershaft supporting hole and an auxiliary case countershaft supporting hole which are not concentric.

As a further improvement of the present application, a side, close to the transmission case, of the boss is supported on the transmission case via a plurality of ribs, and a first radial plate or a second radial plate is provided between the plurality of ribs.

As a further improvement of the present application, the boss is provided with a first reverse countershaft supporting hole arranged coaxially with the second reverse countershaft supporting hole and having a diameter same as a diameter of the second reverse countershaft supporting hole.

As a further improvement of the present application, the transmission case is an aluminum alloy die casting parts, the partition wall has a cylindrical body protruding towards the main case, and a reverse idler gear installation space is formed by milling the cylindrical body vertically via a disk milling cutter.

As a further improvement of the present application, a front end and a rear end of a reverse countershaft are respectively supported in the first reverse countershaft front supporting hole and the second reverse countershaft rear supporting hole; an auxiliary case countershaft front bearing of an auxiliary case countershaft is installed in the auxiliary case countershaft supporting hole; a front step is provided in the first reverse countershaft supporting hole, and the reverse countershaft is located between the front step of the first reverse countershaft supporting hole and a front end surface of the auxiliary case countershaft; and the reverse countershaft is mounted with a reverse idler gear located in the reverse idler gear installation space, a needle bearing is provided between the reverse idler gear and the reverse countershaft, and a shock insulator is provided between the reverse idler gear and the boss.

As a further improvement of the present application, a step formed between the second reverse countershaft supporting hole and the auxiliary case countershaft supporting hole is configured to position the auxiliary case countershaft front bearing, to further limit the position of the auxiliary case countershaft; and two casting through holes passing through the radial plate and the partition wall are provided on the partition wall at a region sandwiched between the auxiliary case countershaft supporting hole and the second reverse countershaft supporting hole, and are configured to detach the auxiliary case countershaft front bearing.

As a further improvement of the present application, in an axial projection direction, the second reverse countershaft supporting hole is partially or entirely in the auxiliary case countershaft supporting hole.

As a further improvement of the present application, the second reverse countershaft supporting hole and the auxiliary case countershaft supporting hole are both provided in the partition wall between the main case and a rear auxiliary case.

Compared to the conventional technology, the present application has the following advantages. In the supporting structure for the reverse countershaft of the transmission according to the present application, multiple ribs are provided to support the boss of the reverse countershaft, and staggered radial plates are provided at front and rear sides of the idle wheel. The boss of the reverse countershaft is cast until reaching the rear auxiliary case partition wall, and in combination with machining work, a reverse idler gear space is milled via a disc milling cutter. Under the premise of ensuring good casting technique, casting windows on two side surfaces of the case is avoided, which improves the processing technique of the case, omits parts such as window cover plates, pads and nuts, and effectively reduces oil leakage fault points; and both ends of the reverse countershaft are supported by the boss, thereby realizing a good supporting rigidity.

BRIEF DESCRIPTION OF THE DRAWINGS

FIG. 1b is a sectional view taken along line X-X in FIG. 1a;

DETAILED DESCRIPTION

The present application is further described in detail hereinafter in conjunction with the accompanying drawings.

Figure 1A:
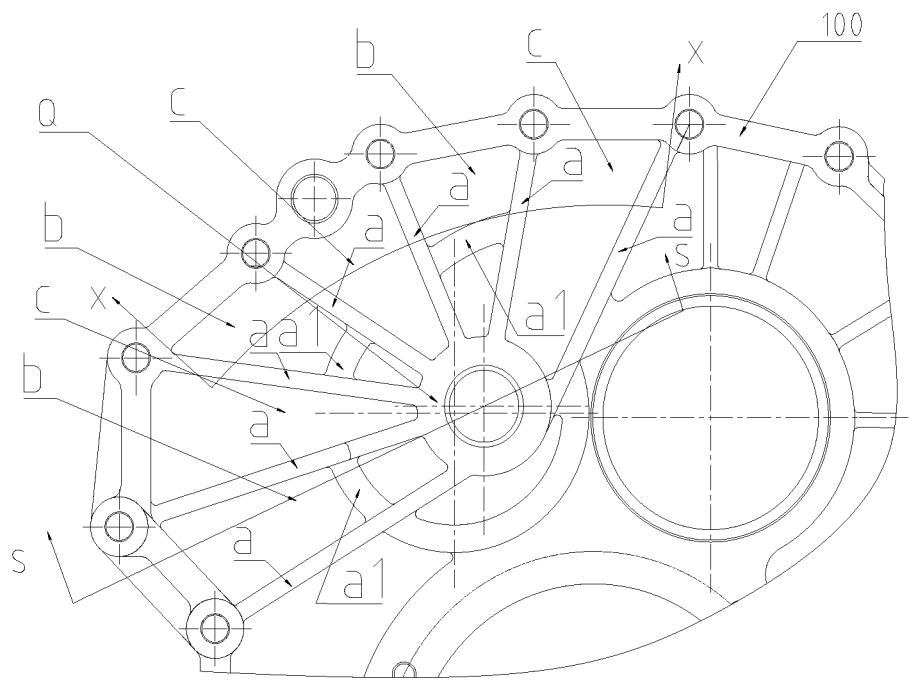
FIG. 1a is a front view of a reverse idler gear region of a transmission housing.
Figure 1B:
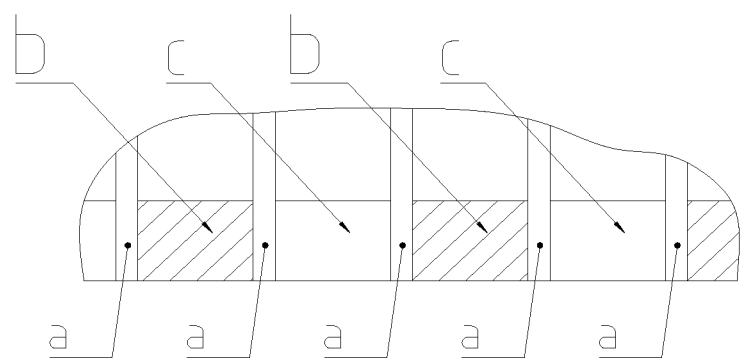
Figure 2:
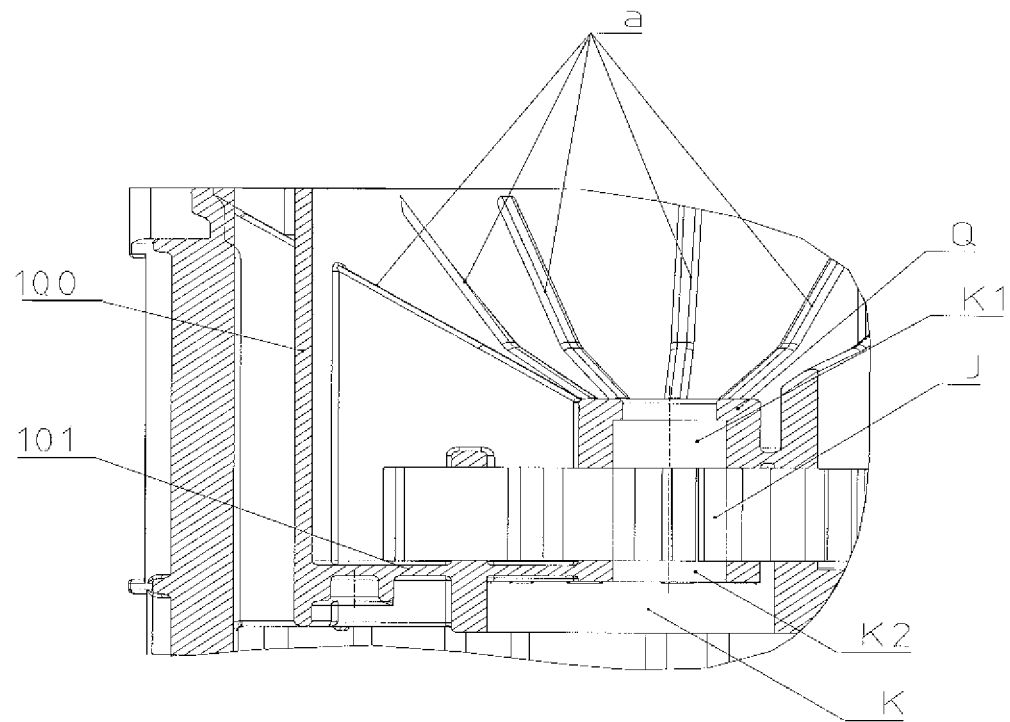
FIG. 2 is a sectional view taken along line S-S in FIG. 1, i.e., a sectional view of the reverse idler gear region of the transmission housing.
Figure 3:
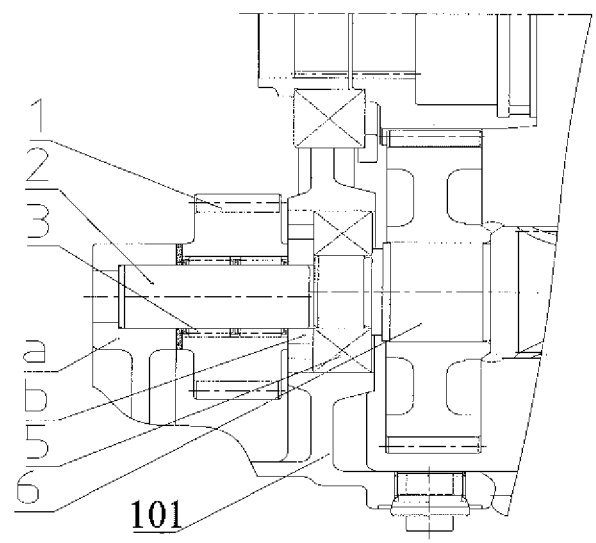
FIG. 3 is a schematic view showing the assembly of the reverse idler gear and an auxiliary case countershaft.
Figure 4:
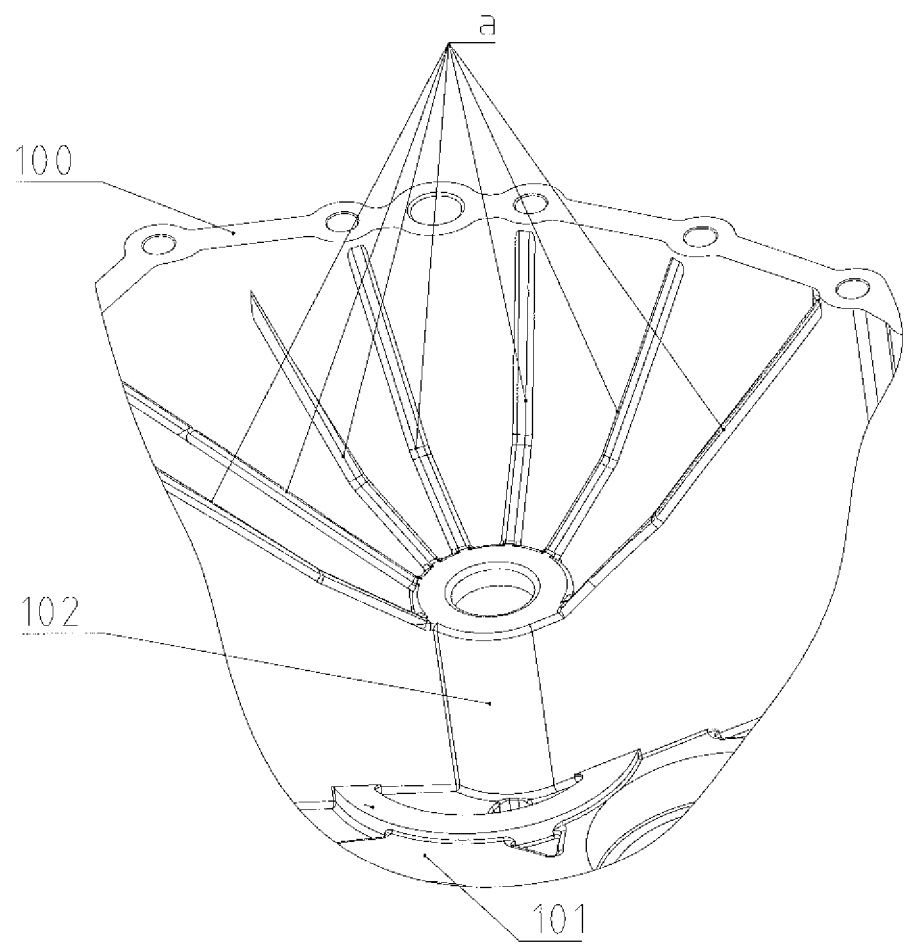
FIG. 4 is a schematic view showing the structure of a cylindrical body 102 before an installation space J for the reverse idler gear is milled therein.
Figure 5:
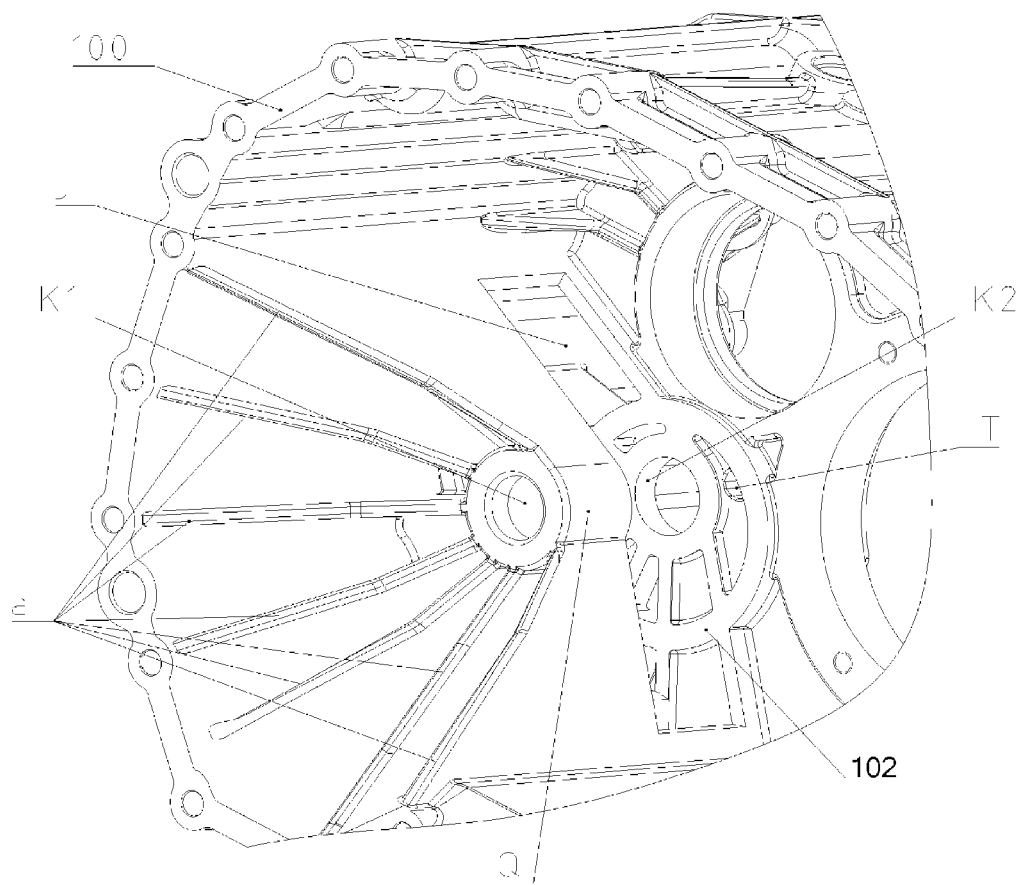
FIG. 5 is a partial perspective view showing the region for installing the reverse countershaft gear of the housing.
Figure 6:
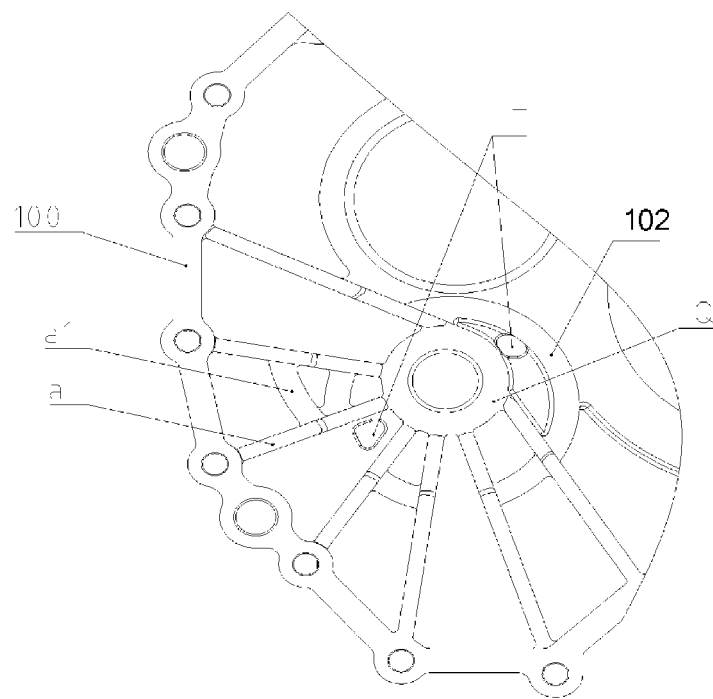
FIG. 6 is a front view showing the region for installing the reverse gear.
Figure 7:
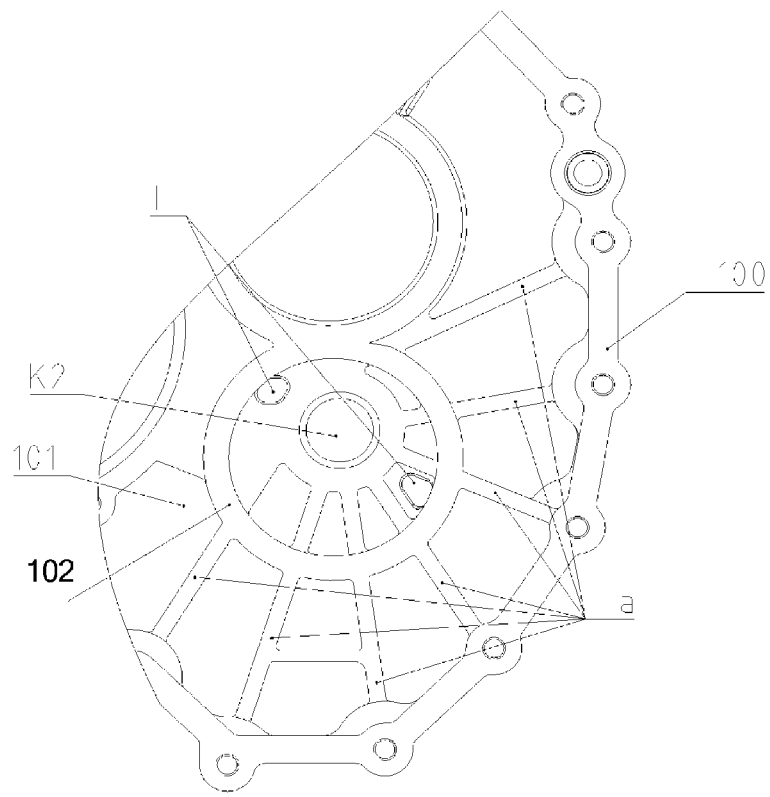
FIG. 7 is a rear view showing the region for installing the reverse gear.

Reference is made to FIGS. 1 to 7. A supporting structure for a reverse countershaft of a transmission according to the present application is made by die casting aluminum alloy, and includes a cylindrical transmission housing 100. A partition wall 101 is provided in the transmission housing 100 to partition a main case and an auxiliary case. The partition wall 101 is provided with a cylindrical body 102 protruding towards the main case, and a side of the cylindrical body 102 close to the transmission housing 100 is supported on the transmission housing 100 via multiple ribs a. For reinforcing the strength of the supporting part for a reverse idler gear 1 and a reverse countershaft 2, as shown in FIG. 1, an arc-shaped reinforcing rib a1 is provided between the ribs without radial plates.

Staggered radial plates b or c (for reinforcement) are provided between the multiple ribs a' at a front side and a rear side of the reverse idler gear 1. When the transmission housing is formed by die casting, in combination with machining work, a reverse idler gear installation space J is formed by milling the cylindrical body 102 vertically via a disk milling cutter, thus under the premise of ensuring good casting technique, casting windows on two side faces of the case is avoided. A boss Q for the reverse idler gear is formed at a front side of the reverse idler gear installation space J, and the partition wall 101 is at a rear side of the reverse idler gear installation space J.

The partition wall 101 is provided with a stepped hole having a large rear end and a small front end, and a second reverse countershaft supporting hole K2 at the front side has a diameter smaller than a diameter of an auxiliary case countershaft supporting hole K at the rear side. The reverse countershaft rear hole K2 formed at the front end of the stepped hole functions as a rear support for the reverse countershaft, and a step formed between the large hole and the small hole functions to axially position a front bearing of the auxiliary case countershaft. The second reverse countershaft supporting hole K2 is arranged eccentrically with respect to the auxiliary case countershaft supporting hole K. The boss Q of the reverse idler gear is provided with a first reverse countershaft supporting hole K1 having a diameter same as the diameter of the second reverse countershaft supporting hole K2 and arranged coaxially with the second reverse countershaft supporting hole K2. Two casting through holes T passing through the radial plate and the partition wall 101 are provided on the partition wall 101 at a region sandwiched between the auxiliary case countershaft supporting hole K and the second reverse countershaft supporting hole K2, and are configured to detach the auxiliary case countershaft front bearing 5.

Front and back supporting and axially positioning of the reverse countershaft are described hereinafter. The front and rear ends of the reverse countershaft 2 are respectively supported in the first reverse countershaft supporting hole K1 and the second reverse countershaft supporting hole K2, and an auxiliary case countershaft front bearing 5 of the auxiliary case countershaft 6 is installed in the auxiliary case countershaft supporting hole K. The reverse idler gear installation space J has a diameter larger than both the diameter of the first reverse countershaft supporting hole K1 and the diameter of the second reverse countershaft supporting hole K2. A step formed between the reverse idler gear installation space J and the first reverse countershaft supporting hole K1 and a step formed between the reverse idler gear installation space J and the second reverse countershaft supporting hole K2 are configured to axially position the reverse idler gear 1. When the transmission is in a reverse mode, the reverse idler gear 1 rotates rightwards, and the reverse countershaft 2 tends to move forwards under a force and is axially positioned by a front step of the first reverse countershaft supporting hole K1; and when the transmission is disengaged from a reverse mode, the reverse countershaft 2 is restricted by a front end surface of the auxiliary case countershaft 6 from moving rearward randomly.

Axially positioning of the auxiliary case countershaft front bearing 5 is described as follows. A stepped hole is formed between the auxiliary case countershaft supporting hole K and the second reverse countershaft supporting hole K2, and thus when the auxiliary case countershaft front bearing 5 moves forwards, the step formed between the hole K and the hole K2 axially positions the auxiliary case countershaft front bearing 5.

The invention claimed is:

1. A supporting structure for a reverse countershaft of a transmission, comprising a transmission case, a partition wall and a boss, wherein the transmission case is partitioned by the partition wall into a main case and an auxiliary case, the partition wall comprises a first side facing the main case and a second side facing the auxiliary case, a cylindrical body is provided in the main case and protrudes from the first side of the partition wall into the main case, the transmission case, the partition wall and the boss are formed integrally, and the boss is located at a front side, away from the first side of the partition wall, of the cylindrical body; a reverse idler gear installation space is provided between the first side of the partition wall and the boss; and the partition wall is provided with a stepped hole comprising a second reverse countershaft supporting hole at a front side facing the main case and an auxiliary case countershaft supporting hole at a rear end facing the auxiliary case, and a diameter of the second reverse countershaft supporting hole is smaller than a diameter of the auxiliary case countershaft supporting hole; the second reverse countershaft supporting hole is configured to support the reverse countershaft, and the auxiliary case countershaft supporting hole is configured to support an auxiliary case countershaft and install an auxiliary case countershaft front bearing of the auxiliary case countershaft, and the second reverse countershaft supporting hole and the auxiliary case countershaft supporting hole are not concentric; and a step formed between the second reverse countershaft supporting hole and the auxiliary case countershaft supporting hole is configured to position the auxiliary case countershaft front bearing to further limit the position of the auxiliary case countershaft.

2. The supporting structure for the reverse countershaft of the transmission according to claim 1, wherein the boss comprises a first side facing the partition wall and a second side away from the partition wall, the second side of the boss is supported on the transmission case via a plurality of ribs, and a first radial plate or a second radial plate is provided between the plurality of ribs.

3. The supporting structure for the reverse countershaft of the transmission according to claim 2, wherein the boss is provided with a first reverse countershaft supporting hole arranged coaxially with the second reverse countershaft supporting hole.

4. The supporting structure for the reverse countershaft of the transmission according to claim 3, wherein the first reverse countershaft front supporting hole and the second reverse countershaft rear supporting hole are respectively configured to support a front end and a rear end of the reverse countershaft; a front step is provided in the first reverse countershaft supporting hole; and a reverse idler gear located in the reverse idler gear installation space is configured to be mounted on the reverse countershaft, and a shock insulator is configured to be provided between the reverse idler gear and the boss.

5. The supporting structure for the reverse countershaft of the transmission according to claim 4, wherein two casting through holes passing through a radial plate and the partition wall are provided on the partition wall at a region sandwiched between the auxiliary case countershaft supporting hole and the second reverse countershaft supporting hole, and are configured to detach the auxiliary case countershaft front bearing.

6. The supporting structure for the reverse countershaft of the transmission according to claim 1, wherein the transmission case is an aluminum alloy die casting part.

7. The supporting structure for the reverse countershaft of the transmission according to claim 1, wherein in an axial projection direction of the reverse countershaft, an axial projection of the second reverse countershaft supporting hole partially coincides with an axial projection of the auxiliary case countershaft supporting hole, or the axial projection of the second reverse countershaft supporting hole is entirely within the axial projection of the auxiliary case countershaft supporting hole.

8. The supporting structure for the reverse countershaft of the transmission according to claim 1, wherein the second reverse countershaft supporting hole and the auxiliary case countershaft supporting hole are both provided in the partition wall between the main case and the auxiliary case.

9. The supporting structure for the reverse countershaft of the transmission according to claim 1, wherein the second reverse countershaft supporting hole is a through hole.

10. A transmission, comprising a reverse countershaft, an auxiliary case countershaft, and the supporting structure for the reverse countershaft according to claim 1.

11. The transmission according to claim 10, wherein the boss comprises a first side facing the partition wall and a second side away from the partition wall, the second side of the boss is supported on the transmission case via a plurality of ribs, and a first radial plate or a second radial plate is provided between the plurality of ribs.

12. The transmission according to claim 11, wherein the boss is provided with a first reverse countershaft supporting hole arranged coaxially with the second reverse countershaft supporting hole.

13. The transmission according to claim 12, wherein a front end and a rear end of the reverse countershaft are respectively supported in the first reverse countershaft front supporting hole and the second reverse countershaft rear supporting hole; the auxiliary case countershaft front bearing of the auxiliary case countershaft is installed in the auxiliary case countershaft supporting hole; a front step is provided in the first reverse countershaft supporting hole, and the reverse countershaft is located between the front step of the first reverse countershaft supporting hole and a front end surface of the auxiliary case countershaft; and the reverse countershaft is mounted with a reverse idler gear located in the reverse idler gear installation space, a needle bearing is provided between the reverse idler gear and the reverse countershaft, and a shock insulator is provided between the reverse idler gear and the boss.

* * * * *